United States Patent Office 3,349,057
Patented Oct. 24, 1967

3,349,057
POLYSULFIDE POLYMERS WITH STABILIZED PROPERTIES
Joseph J. Giordano, Woodbridge, N.J., assignor to Thiokol Chemical Corporation, Bristol, Pa., a corporation of Delaware
No Drawing. Filed May 12, 1964, Ser. No. 366,898
22 Claims. (Cl. 260—45.75)

ABSTRACT OF THE DISCLOSURE

A cure stabilizing system of copper salts in a polar liquid in combination with orthonitroanisole is provided for use with metal oxide cured polysulfide polymer based compositions.

---

This invention relates to the curing of liquid polysulfide polymers. In particular, this invention relates to curable compositions comprising liquid polysulfide polymers, metal oxide curing agents, orthonitroanisole and a novel cure stabilizing system comprising copper salts and polar liquids. It further relates to the novel process used with said compositions to produce novel vulcanizates with stabilized properties.

It is an object of this invention to provide curable compositions of relatively low molecular weight polysulfide liquid polymers, metal oxide curing agents and orthonitroanisole which have consistent curing properties.

It is another object of this invention to provide a process for converting curable compositions of relatively low molecular weight polysulfide liquid polymers to vulcanizates which have consistent physical properties.

It is another object of this invention to provide vulcanizates of polysulfide liquid polymers, metal oxide curing agents and orthonitroanisole which have consistent physical properties.

Other desirable objects of this invention will be apparent from or inherent in the following explanations and examples.

Liquid polysulfide polymers of the type disclosed in the Patrick and Ferguson Patent, U.S. 2,466,963, are now well known and have been extensively used for a variety of commercial applications. When cured to form rubber-like solids, they possess a number of commercially important properties. They are inert to oil, most solvents, water and mild acids and alkalies, as well as to ozone and sunlight. They are tough and resilient and retain their flexibility at extremely low temperatures. Moreover, they are impermeable to gases and moisture and are capable of adhering tenaciously to such diverse materials as glass, metals, plastics, wood, leather and fabrics. Because of these valuable properties, they have been extensively used as impregnating, sealing, caulking, and coating materials as well as for a variety of special uses such as gasoline hose, printing rolls and potting compounds for electrical components.

The polysulfide polymers are characterized by the fact that they have recurring polysulfide linkages between organic radicals having at least two primary carbon atoms for connection to disulfide linkages. Thus, for example, disulfide polymers have a general structure corresponding to the formula

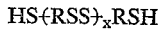

in which the R's are organic polyvalent radicals, preferably predominantly divalent alkylene, oxahydrocarbon or thiahydrocarbon radicals such as diethyl formal radicals, and $x$ is a number greater than one which may vary from a relatively small number in the case of liquid polymers having a molecular weight of about 500 to 12,000, e.g., about 3 to 100 where R is $-(CH_2CH_2)-$, to a relatively large number in the case of solid polymers which may have a molecular weight of about 100,000 to several million. The low molecular weight polysulfide polymers, e.g., 500 to 12,000, are normally liquids at 25° C. and are preferably formed by reaction of an organic dihalide with a backbone corresponding to R with an inorganic polysulfide, such as $Na_2S_y$, $y$ usually being greater than two. Solid organic polysulfide polymers are produced thereby which may then be split according to the method of Patrick and Ferguson in U.S. 2,466,963 to provide liquid polysulfide polymers. The present invention concerns the cure of such liquid polymers, and in particular their cure with metal oxide curing agents.

Methods and materials for effecting the vulcanization of liquid polysulfide polymers have heretofore been proposed. Thus, for example, a variety of such metal oxides have been revealed in the aforementioned patent to Patrick and Ferguson, and in Patrick's patents U.S. 2,195,380 and 2,206,643. In the latter patents the use of sundry aryl and alkaryl nitro compounds as curing aids in conjunction with metal oxide curing agents was revealed. Rosenthal et al. in U.S. 2,940,959 also used the nitro compounds dinitrobenzene and trinitrobenzene to aid the cure of relatively low molecular weight polymers, e.g., 1,000 to 2,000, with a manganite-coated manganese dioxide curing agent. Through these reportings it became well known to the art that the use of nitroaryl compounds with metal oxide curing agents provided desirable synergistic effects in the vulcanization of liquid polysulfide polymers. The amounts of metal oxide curing agent required for attaining good polysulfide vulcanizates were much less where aided by the presence of nitroaryl compounds, than when such nitroaryl compounds were not used. Such prior art metal oxide/nitroaryl curing systems, however, had distinct disadvantages. For example, they would rapidly cure the polymers at room temperature, e.g., 25° C. The curable compositions would thus thicken from a mixture of workable consistency, to a heavy syrup, or to a gelled, or set condition of unworkable consistency at room temperature in a very short time. The attainment of the unworkable consistency usually occurred over a period as short as one half to two hours. It is only during the interval of relative workability of the cure compositions and prior to gellation that the polymer systems may be readily worked to coat or pot articles, or to fill molds. This interval is known in the art as the "working life" or "pot life" of the compositions. The progressive and rapid thickening of the reported curable polysulfide compositions during the working life also made divestiture of occluded and dissolved gas therefrom most difficult if not impossible, and thus provided in the end rubber articles having undesirable surface pock marks and internal voids.

The metal oxide/nitroaryl curing systems in the reported literature provided yet another substantial disadvantage. The rubbery products obtained therewith were subject to undesirable migration of the nitroaryl compounds to the surfaces of the rubber articles produced, there to accumulate and discolor with an unsightly blush or bloom. This is known as "blooming." The blooming resulting from the use of the reported nitroaryl compounds not only detracted from the aesthetic value of the molded end articles made therewith, but it was also believed to detract from the utilty of articles for certain end uses, such as for printers rolls. The "bloom" could usually be wiped off prior to use of the article, but as more of the reported nitroaryl compounds migrated to the surfaces, the bloom reappeared in time.

It has been subsequently disclosed by Panek, in copending application No. 328,054, filed on Dec. 4, 1963, now U.S. Patent 3,282,902, that where orthonitroanisole was used to the extent of about 2 to 50 parts by weight per 100 parts by weight of liquid polysulfide polymers of the type revealed in U.S. 2,466,963 in admixture with those metal oxide curing agents known to be useful in promoting the vulcanization of liquid polysulfide polymers that (1) curable compositions were formed which had prolonged working lives at room temperatures, e.g., about 80° F., and which would often extend into days; and (2) upon cure the vulcanizates produced would be extraordinarily bloom resistant. Despite these advantages, however, other difficulties are encountered with metal oxide/orthonitroanisole curing systems.

These difficulties arise from an unusual sensitivity of curable polysulfide/metal oxide/orthonitroanisole systems to even small variations in quantity of type of the component ingredients used in a system recipe. This sensitivity is often manifest by inconsistent trends, both in the cure properties e.g., cure rate, and in the physical properties of the resulting vulcanizates with even small changes made in the amounts and types of recipe ingredients, such as that of the metal oxide curing agents and/or the orthonitroanisole curing aid, and/or the adjuvant materials. It is also often manifest by a poor reproducibility of cure properties and of the physical properties of the resulting vulcanizates where apparently identical curing recipes and conditions are used, albeit at different times of day or week, or with different batches or lots of ingredients used. It is even manifest to the degree of occasionally providing no cure at all. The present invention concerns the remedy of such difficulties, and concerns in particular cure systems employing orthonitroanisole as the curing aid.

In general, the instabilities and inconsistencies exhibited in curing characteristics of polysulfide liquid polymers using orthonitroanisole as the curing aid are substantially assuaged, and the objects of this invention are attained through the use as a part of the curable compositions of this invention of a novel curing stabilizer system comprising per 100 parts by weight of polysulfide liquid polymer, 2 to 50 parts by weight of orthonitroanisole, at least 0.005 part by weight of copper derived from at least one polar-liquid-soluble copper salt and at least 0.01 part by weight of at least one polar liquid which liquid has a group dipole moment of at least 0.5 debye units. The stabilizer systems, for the purpose of this invention, may be in the form (a) of solutions of copper salts in the polar liquids; (b) of finely dispersed suspensions of the copper salts partially dissolved in the polar liquids; and (c) of each of the aforesaid copper salts and the polar liquids used as separate recipe ingredients mixed together at the time of, and with the mixing of the composition ingredients.

The copper salts which may be used, according to the invention, are those which are soluble in polar liquids to the extent of at least 5% by weight. This is what is meant by a polar-liquid-soluble copper salt. Where the solubility is less than 5% it is believed that not enough copper is made available to produce satisfactory stabilization of the curable compositions. Where water is the polar liquid used, a large number of copper salts will fall within the foregoing requirement and may be used in the present compositions; for example, cupric acetate, cupric ammonium chloride, cupric bromide and bromate, cupric chloride and chlorate, cupric formate, cupric lactate, cupric nitrate, cupric potassium chloride, cupric salicylate, cupric selenate, cupric silicofluoride, and cupric sulfate. When the water used is made alkaline, such as by the presence in the curable composition of alkaline materials such as alkaline fillers, other copper salts may fall within the required minimum of 5% solubility and may also be used, such as cupric arsenate, cupric acid arsenate, cupric arsenite, cupric carbonate, cupric chromate and dichromate, cupric ferro- and ferricyanide, cupric hydroxide, cupric iodate, cupric nitroprusside, cupric oxide, cupric phosphate, cuprous carbonate, cuprous chloride, cuprous cyanide, cuprous ferro and ferricyanide, cuprous hydroxide, cuprous oxide, cuprous sulfide and cuprous thiocyanate. The amounts of copper needed to provide the desirable effects of the present invention are very small, i.e., at least 0.005 part by weight of copper, as provided by copper salts defined as above, per 100 parts by weight of polysulfide polymers.

Polar liquids are also required, according to the present invention, with the above defined copper salts to provide the desired stabilizing effects in polysulfide/metal oxide curing agent/orthonitroanisole cure systems and vulcanizates. Polar liquids, in the sense of the present invention, are liquids either in their pure chemical state or as liquid solutions which, in effect, have a group dipole moment of at least 0.5 debye units, i.e., $0.5 \times 10^{-18}$ e.s.u. The useful polar liquids are either substantially neutral or alkaline in nature when compared with water. Liquids which are by nature acidic when compared with water may be counterbalanced by alkaline components such as alkaline fillers in the curable composition so as to essentially neutralize their acidity. These may be used, although this is not a preferred procedure. Acidic liquids, per se, tend to have a generally unfavorable effect on the polysulfide/metal oxide curing agent/orthonitroanisole systems in that they tend to retard cure and/or promote polymer chain scission. Typical polar liquids which are useful in the present compositions include water, alkanols, ammonia, etheralkanols, esters, ketones, amines, aldehydes, mixtures of the foregoing, and solutions thereof with at least partially soluble neutral and alkaline substances. The preferred polar liquids for present use are water, the lower alkanols and ketones, mixtures thereof, and solutions thereof with neutral and alkaline substances. By "lower alkanols and ketones" is meant such compounds having up to 5 carbon atoms. Useful quantities of polar liquids in compositions of the present invention start at a minimum of about 0.01 part by weight per 100 parts by weight of polysulfide polymers.

Orthonitroanisole is used in compositions of the present invention in amounts of from 2 to 50 parts by weight per 100 parts by weight of liquid polysulfide polymer. Where less than 2 parts of orthonitroanisole are used per hundred of polythiopolymercaptan liquid polymer no significant synergism with metal oxide curing agents appears. Where more than 50 parts of orthonitroanisole are used per hundred of polysulfide liquid polymer, no significant advantage is obtained over the use of lesser quantities. The amount of orthonitroanisole to be used in any specific curable composition depends not only upon the properties desired in the end article, such as hardness, etc., but also upon the molecular weight and type of polysulfide liquid polymer used, the type and amounts of metal oxide curing catalyst used and also upon the types and amounts of adjuvants such as plasticizers, reinforcing and pigmenting fillers, etc., that are employed. The most useful quantities within this usable range are about 3 to 15 parts by weight of orthonitroanisole per 100 parts by weight of polymer.

Various metal oxide curing agents have proved useful in the vulcanization of polysulfide liquid polymers. Some have already been alluded to and are useful in the practice of this invention; in addition, $Sb_2O_3$, as reported in U.S. 3,036,049, $MgO_2$, $TeO_2$ and $SeO_2$ also benefit from use with orthonitroanisole in the stabilizer systems of this invention. The curing agents which exhibit an outstanding synergistic activity with orthonitroanisole and the stabilizer systems of this invention include $MnO_2$, $MnO_2$ coated with manganite, and $TeO_2$ for polymers of low molecular weight, and $SeO_2$, $Sb_2O_3$, $CaO_2$, $MgO_2$ and $PbO_2$ for polymers of higher molecular weight. The synergistic effect is expecially evident in the cure of the liquid polysulfide polymers of low molecular weight, e.g., 500 to 4,000. The useful amounts of metal oxide curing agents will vary depending upon the nature of the product desired, the physical properties sought therein and the nature of the particular metal oxide and adjuvants employed in the curable compositions. In general, useful amounts will vary from about one to more than twenty parts by weight of metal oxide per one hundred parts by weight of polysulfide liquid polymer, and if used these amounts are enough to oxidize substantially all of the free —SH groups present in the polymer.

The curable compositions of this invention are prepared by placing the liquid polysulfide polymers, metal oxide curing agents, orthonitroanisole/the copper salt/polar liquid stabilizer systems, and adjuvants into a uniform and intimate admixture, as by mixing by hand, on a paint mill or in an internal mixer. The compositions may be prepared in one effort and at one time by mixing together all components. They also may be prepared, especially where considerations of considerably long termed storage are paramount, as several partial mixtures of blended components variously known as two-package or three-package compositions. These partial mixtures are then subsequently combined into a blend of all necessary components prior to use. For example, one partial mixture may contain the liquid polysulfide polymers, the curing stabilizer system with the orthonitroanisole, and the other partial mixture the metal oxide in a liquid vehicle. Optionally, the polymer may be by itself or with adjuvants as one partial mixture, and the second mixture may consist of the curing stabilizer system with orthonitroanisole, and the metal oxide. Adjuvants may conveniently be distributed between the storable partial mixtures. For purposes of long termed storage it is desirable to store the polymers separate from the metal oxides. At the time of use the component ingredients, whether as separate substances or as premixed partial mixtures are blended to form a single mixture, and are degassed prior to cure.

The novel curing process of this invention may be considered as essentially a two step process which includes as the first step the admixture of at least the necessary component ingredients required to form the curable compositions of the invention, e.g., the polysulfide polymer, metal oxide curing agent, copper salt/polar liquid cure stabilizer system with orthonitroanisole. In the second step the blended curable compositions are cured at temperatures of about 70 to 350° F. for about 0.1 to 100 hours, the shorter cure times requiring the higher curing temperatures. The vulcanized article obtained thereby is then brought to ambient temperatures and recovered prior to use.

More detailed illustrations of specific embodiments of the novel curable compositions, the novel cure process and the novel vulcanizates of this invention are contained in the examples. The examples are merely illustrative of the present invention and are not intended as a limitation upon the scope of the claims.

In the following examples, an intimate blend of the ingredients of the curable compositions was prepared by milling together the polysulfide liquid polymer with the nitroaryl compound used and at least a portion of the other adjuvants as one partial mixture; and by milling together the metal oxide curing agent and the copper salt/polar liquid partial stabilizer system in a liquid vehicle with perhaps some of the other adjuvants as the second partial mixture; then combining the two partial mixtures by hand mixing at room temperature from the time of mixing to the time when the compositions were no longer pourable. The cure time was observed to be that interval at a specified temperature in which one obtained a tack-free elastomeric solid. The cure times listed herein are merely times which happened to be observed and are not necessarily the minimum cure times required. In general, the compositions were cured to form vulcanizates in the form of test sheets. These were examined for physical property data, such as tensile properties (ASTM D412–51T) and hardness (ASTM D676–59T).

Polysulfide polymers of different molecular weights were used; LP–3 polysulfide liquid polymer has a molecular weight of about 1,000, a 2% crosslink with trichloropropane and a backbone that is essentially $$HS(C_2H_4OCH_2OC_2H_4SS)_nC_2H_4OCH_2OC_2H_4SH$$

LP–2 polysulfide polymer is similar to LP–3 polymer, except that the molecular weight is higher, i.e., about 4,000. The nitroaryl compounds used were commercial grade chemicals. The manganese dioxide used in these examples was Manganese Hydrate No. 37, a substance being 70% $MnO_2$, 22% water of hydration, 43.8% manganese and 12.5% in available oxygen. The solvent vehicles used were Aroclor 1254, a polychlorinated biphenyl of 54% chlorine, and HB–40, a partially hydrogenated terphenyl. Occasionally a surface active agent, Duponol L–144–WDG, was used and is so indicated by footnote. This is a sodium salt of a modified unsaturated long chain alcohol sulfate. The cupric chloride used was a purified compound of empirical formula $CuCl_2.2H_2O$ and of formula weight 170.49. The cupric acetate used was a reagent quality compound of empirical formula $Cu(C_2H_3O_2)_2.H_2O$, and of formula weight 199.65. The water used was ordinary tap water. All ingredients are given in parts by weight (p.b.w.) and are listed in the recipes as separate entities rather than as components of partial mixtures.

| Example | 1 | 2 | 3 |
|---|---|---|---|
| Recipe Ingredients in p.b.w.: | | | |
| LP–3 polysulfide polymer | | 100 | 100 |
| LP–2 polysulfide polymer | 100 | | |
| Manganese dioxide | 2.38 | 2.12 | 2.12 |
| Orthonitroanisole | 3 | 5 | |
| 2,4-dinitrobenzene | | | 5 |
| Medium Thermal Furnace carbon black (Sterling MT) | 0.6 | 30.5 | 30.5 |
| Titanium dioxide (Titanox RA–50) | 25 | | |
| HB–40 terphenyl | 1.8 | 1.6 | 1.6 |
| $CuCl_2.2H_2O$ | 0.01 | 0.01 | 0.01 |
| Curing conditions: | | | |
| Working life, at 80° F., in hours | 10 | >24 | 0.8 |
| Curing temperature, in ° F. | 158 | 180 | 180 |
| Curing time observed, in hours | 0.9 | 5 | 5 |
| Physical Properties of Vulcanizates: | | | |
| Ultimate tensile Strength, in p.s.i. | (¹) | 175 | 230 |
| Ultimate Elongation, in percent | (¹) | 260 | 270 |
| Hardness in Shore "A" durometer degrees | 45 | 36 | 44 |

¹ Not tested.

Examples 1 and 2 indicate that regardless of molecular weight, polysulfide liquid polymers will form curable compositions with orthonitroanisole and copper salt/polar liquid stabilizer systems which have desirable long termed working life. Examples 2 and 3 demonstrate the differences in working life obtained with curable polysulfide polymer based compositions using orthonitroanisole on the one hand a nitroaryl of the prior art, dinitrobenzene, on the other hand. In instances where orthonitroanisole was used, the vulcanizates were substantially bloom-resistant; whereas when dinitrobenzene was used the vulcanizates often exhibited bloom. Beyond the working life periods indicated, at 80° F., the compositions would thicken and vulcanize to solid elastomers in less than 100 hours.

In Examples 4 to 16, below, an intimate blend of the ingredients of the curable compositions was prepared by milling together the polysulfide liquid polymer with orthonitroanisole, and at least a portion of the other adjuvants as one partial mixture, and by milling together the manganese dioxide curing agent, copper salts, and polar liquids where used in a liquid vehicle with some of the other adjuvants as the second partial mixtures at room temperature to form the specific curable composition. Different curing pastes employing partial stabilizing systems of this invention were used. One, that containing cupric chloride and water, was blended on a paint mill according to the recipe:

*Curing paste 1*

| Ingredient: | Parts by wt. |
|---|---|
| MnO$_2$ | 47.6 |
| HB-40 terphenyl | 37.5 |
| Sterling MT carbon black | 11.9 |
| CuCl·2H$_2$O | 2.38 |
| Water | 2.38 |
| (Copper content of paste) | 0.89 | and was used in Examples 10 to 13, 15 and 16. The other curing paste, that containing cupric acetate and water, was blended on a paint mill according to the recipe:

*Curing paste 2*

| Ingredient: | Parts by wt. |
|---|---|
| MnO$_2$ | 48.3 |
| HB-40 terphenyl | 35.4 |
| Sterling | 11.8 |
| Cu(C$_2$H$_3$O$_2$)·H$_2$O | 1.1 |
| Water | 4.4 |
| (Copper content of paste 2) | 0.35 | and was used in Example 14. The copper salts and water were added to the other curing paste ingredients in the form of solutions prior to milling. Again, all ingredients in the table of examples below are listed as separate entities, rather than as components of partial mixtures.

| Example | 4 | 5 | 6 | 7 | 8 | 9 | 10 | 11 | 12 | 13 | 14 | 15 | 16 |
|---|---|---|---|---|---|---|---|---|---|---|---|---|---|
| Recipe in p.b.w.: | | (²) | | | | (²) | | | (²) | (²) | (²) | (²) | (²) |
| LP-3 polysulfide polymer | 100 | 100 | 100 | 100 | 100 | 100 | 30.4 | 30.6 | 30.4 | 30.7 | 30.7 | 31.1 | 31.1 |
| Sterling MT, carbon black | 30 | 30 | 30 | 30 | 30 | 30 | 5 | 5 | 12 | 12 | 12 | 5 | 5 |
| o-Nitroanisole | 4 | 12 | 5 | 4 | 5 | 12 | 1.43 | 2.38 | 1.43 | 2.86 | 2.9 | 4.28 | 5.7 |
| Manganese dioxide | 1.5 | 1.5 | 1.5 | 2.5 | 2.5 | 3.0 | 0.0 | 0.0 | 0.0 | 0.0 | 0.0 | 0.0 | 0.0 |
| Aroclor 1254, biphenyl | 1.5 | 1.5 | 1.5 | 2.5 | 2.5 | 3.0 | 1.12 | 1.88 | 1.12 | 2.24 | 2.12 | 3.38 | 4.5 |
| HB-40, terphenyl | 0.0 | 0.0 | 0.0 | 0.0 | 0.0 | 0.0 | 0.07 | 0.12 | 0.07 | 0.14 | 0.0 | 0.24 | 0.29 |
| CuCl$_2$·2H$_2$O | 0.0 | 0.0 | 0.0 | 0.0 | 0.0 | 0.0 | 0.0 | 0.0 | 0.0 | 0.0 | 0.07 | 0.0 | 0.0 |
| Cu(C$_2$H$_3$O$_2$)$_2$·H$_2$O | 0.0 | 0.0 | 0.0 | 0.0 | 0.0 | 0.0 | 0.03 | 0.0445 | 0.03 | 0.06 | 0.02 | 0.08 | 0.108 |
| Copper content of recipe | 0.0 | 0.0 | 0.0 | 0.0 | 0.0 | 0.0 | 0.07 | 0.12 | 0.07 | 0.14 | 0.26 | 4.24 | 0.29 |
| Water added | 0.0 | 0.0 | 0.0 | 0.0 | 0.0 | 0.0 | | | | | | | |
| Curing Conditions: | | | | | | | | | | | | | |
| Curing time to tack-free state at state at 180° F., in min | (¹) | (¹) | 240 | (³) | 120 | 65 | 150 | 150 | 30-35 | 20 | 40-60 | 64 | 51 |
| Cure time for test sheets at 180° F., in hr | 16-22 | 22 | 16-22 | 22 | 16-22 | 22 | 16-22 | 16-22 | 22 | 22 | 22 | 22 | 22 |
| Vulcanizate properties of test sheets: | | | | | | | | | | | | | |
| Hardness, in Shore "A" durometer degrees | (¹) | (¹) | 39 | 27 | 36 | 31 | 40 | 41 | 34 | 33 | 34 | 36 | 35 |
| Ultimate tensile strength, in percent | (¹) | (¹) | 242 | 95 | 209 | 142 | 180 | 202 | 165 | 158 | 163 | 189 | 195 |
| Ultimate elong., in percent | (¹) | (¹) | 290 | 440 | 280 | 280 | 240 | 260 | 310 | 330 | 350 | 290 | 390 |

¹ No cure.  ² Recipe contains 0.17 p.b.w. of Duponol L-144-WPG.  ³ Not tested.

The inconsistent and unstable curing qualities and vulcanizate properties of prior art compositions are to be seen upon comparison of Examples 4 to 9. They appear to evidence an unusual sensitivity to changes in recipe amounts and components. Compositions of the present invention, Examples 10 to 16, on the other hand show enhanced consistency, stability and lack of undue sensitivity in these regards despite changes in amounts of recipe ingredients.

Where any of the copper salt/polar liquid orthonitroanisole stabilizer systems prepared from the useful copper salts and polar liquids enumerated in the specification above, and according to the requisites of solubility and polarity in debye units as defined above, are used in any of the foregoing examples in place of the stabilizer systems recited therein, similar results of enhanced consistency, stability, and lack of undue sensitivity to changes in amounts of recipe ingredients are obtained.

I claim:

1. A cure stabilizer and regulating composition for use with curable systems of liquid organic polysulfide polymers and metal oxide curing agents comprising in admixture
    (a) at least 0.01 part by weight of a polar liquid, said liquid having a group dipole moment of at least 0.5 debye units;
    (b) at least 0.005 part by weight of copper as provided by a copper salt that is soluble in said polar liquid to the extent of at least 5% by weight of said liquid; and
    (c) at least 2 parts by weight of orthonitroanisole per 100 parts by weight of said liquid polysulfide polymer, said polysulfide polymer being ordinarily liquid at 25° C. and having the formula HS(RSS)$_x$RSH, wherein R is a divalent aliphatic radical selected from the group consisting of alkylene, oxahydrocarbon and thiahydrocarbon radicals, and $x$ is a number between 3 and 100.

2. A cure stabilizer and regulating composition as in claim 1 wherein said polar liquid is water.

3. A curable polysulfide polymer based composition comprising in uniform admixture
    (a) a polysulfide polymer that is ordinarily liquid at 25° C. and of the formula HS(RSS)$_x$RSH, wherein R is a divalent aliphatic radical selected from the group consisting of alkylene, oxahydrocarbon and thiahydrocarbon radicals, and $x$ is a number between 3 and 100;
    (b) a metal oxide curing agent for said polysulfide polymer;
    (c) orthonitroanisole; and
    (d) a cure stabilizing system comprising at least one polar liquid with a dipole moment of at least 0.5 debye units, and at least one copper salt that is soluble in said polar liquid to the extent of at least 5% by weight based upon the weight of said polar liquid.

4. A curable polysulfide polymer based composition as in claim 3 wherein said liquid polysulfide polymer has a molecular weight between 500 and 12,000.

5. A curable polysulfide polymer based composition as in claim 4 wherein said liquid polysulfide polymer has a molecular weight of about 1,000 to 4,000.

6. A curable polysulfide polymer based composition as in claim 3 wherein said R is an oxahydrocarbon radical.

7. A curable polysulfide polymer based composition as in claim 3 wherein said orthonitroanisole is present in from about 2 to 50 parts by weight per 100 parts by weight of polysulfide polymer.

8. A curable polysulfide polymer based composition as in claim 3 wherein said metal oxide curing agent is manganese dioxide.

9. A curable polysulfide polymer based composition as in claim 3 wherein said metal oxide curing agent is present in quantities necessary to oxidize substantially all of the free —SH groups present in said polysulfide polymer.

10. A curable polysulfide polymer based composition as in claim 3 wherein said metal oxide curing agent is present in quantities of about 1 to 20 parts by weight per 100 parts by weight of said polysulfide polymer.

11. A curable polysulfide polymer based composition as in claim 3 wherein said copper salt is present in quantities of at least 0.005 part by weight of copper per 100 parts by weight of said polysulfide polymer.

12. A curable polysulfide polymer based composition as in claim 3 wherein said copper salt is cupric chloride.

13. A curable polysulfide polymer based composition as in claim 3 wherein said copper salt is cupric acetate.

14. A curable polysulfide polymer based composition as in claim 3 wherein said polar liquid is present in at least 0.01 part by weight per 100 parts by weight of said polysulfide polymer.

15. A curable polysulfide polymer based composition as in claim 3 wherein said polar liquid is selected from the group of polar liquids consisting of water, alkanols, ammonia, ether-alkanols, esters, ketones, amines, aldehydes, mixtures thereof, and solutions thereof with at least partially soluble neutral and alkaline substances.

16. A curable polysulfide polymer based composition as in claim 15 wherein said polar liquid is water.

17. A process for providing polysulfide polymer based vulcanizates of consistent physical properties comprising the steps of
  (a) mixing to uniform admixture
    (I) a polysulfide polymer that is ordinarily liquid at 25° C. and of the formula HS(RSS)$_x$RSH, wherein R is a divalent aliphatic radical selected from the group consisting of alkylene, oxahydrocarbon, and thiahydrocarbon radicals, and $x$ is a number of about 3 to 100,
    (II) a metal oxide curing agent for said polysulfide polymer, said curing agent being present in from about 1 to 20 parts by weight per 100 parts by weight of said polysulfide polymers,
    (III) orthonitroanisole, said orthonitroanisole being present in from about 2 to 50 parts by weight per 100 parts by weight of said polysulfide polymer,
    (IV) a polar liquid which has a group dipole moment of at least 0.5 debye units, and is present in at least 0.01 part by weight per 100 parts by weight of said polysulfide polymer, and
    (V) a copper salt that is soluble to the extent of at least 5% in said polar liquid, and is present in at least about 0.005 part by weight of copper per 100 parts by weight of said polysulfide polymer;
  (b) subjecting the admixture prepared in step (a) to curing temperatures of 70° F. to 350° F. for 0.1 to 100 hours to provide a solid elastomeric vulcanizate.

18. A process as in claim 17 wherein said liquid polysulfide polymer has a molecular weight of about 1,000 to 4,000.

19. A process as in claim 17 wherein said polar liquid is water.

20. A process as in claim 17 wherein said copper salt is cupric chloride.

21. A process as in claim 17 wherein said copper salt is cupric acetate.

22. The vulcanizate produced by the process of claim 17.

References Cited
UNITED STATES PATENTS

| | | | |
|---|---|---|---|
| 2,195,380 | 3/1940 | Patrick | 260—79 |
| 2,466,963 | 4/1949 | Patrick | 260—79.1 |
| 3,282,902 | 11/1966 | Panek | 260—79.1 |

DONALD E. CZAJA, *Primary Examiner.*

LEON J. BERCOVITZ, *Examiner.*

V. P. HOKE, *Assistant Examiner.*

UNITED STATES PATENT OFFICE
CERTIFICATE OF CORRECTION

Patent No. 3,349,057                          October 24, 1967

Joseph J. Giordano

It is hereby certified that error appears in the above numbered patent requiring correction and that the said Letters Patent should read as corrected below.

Column 2, line 62, "known" should read -- known in the art --. Column 3, line 16, "of", first occurrence, should read -- or --. Column 7, line 6, "CuCl" should read -- $CuCl_2$ --; line 18, "$Cu(C_2H_3O_2) \cdot H_2O$" should read -- $Cu(C_2H_3O_2)_2 \cdot H_2O$ --. Columns 7 and 8, in the table, first column, line 14 thereof, cancel "state at".

Signed and sealed this 28th day of October 1969.

(SEAL)
Attest:

EDWARD M. FLETCHER, JR.
Attesting Officer

WILLIAM E. SCHUYLER, JR.
Commissioner of Patents